Nov. 8, 1949  C. W. McKEE ET AL  2,487,572
MANUAL TAKE-OFF FOR PORTABLE FLAW DETECTOR CARS
Filed April 25, 1947  3 Sheets-Sheet 1

INVENTORS:
Chester W. McKee,
BY Richard W. McKee,
Wilfred S. Stone
atty.

Nov. 8, 1949  C. W. McKEE ET AL  2,487,572
MANUAL TAKE-OFF FOR PORTABLE FLAW DETECTOR CARS
Filed April 25, 1947  3 Sheets-Sheet 2

INVENTORS.
Chester W. McKee,
BY Richard W. McKee,

Wilfred S. Stone
Atty

Nov. 8, 1949 C. W. McKEE ET AL 2,487,572
MANUAL TAKE-OFF FOR PORTABLE FLAW DETECTOR CARS
Filed April 25, 1947 3 Sheets-Sheet 3
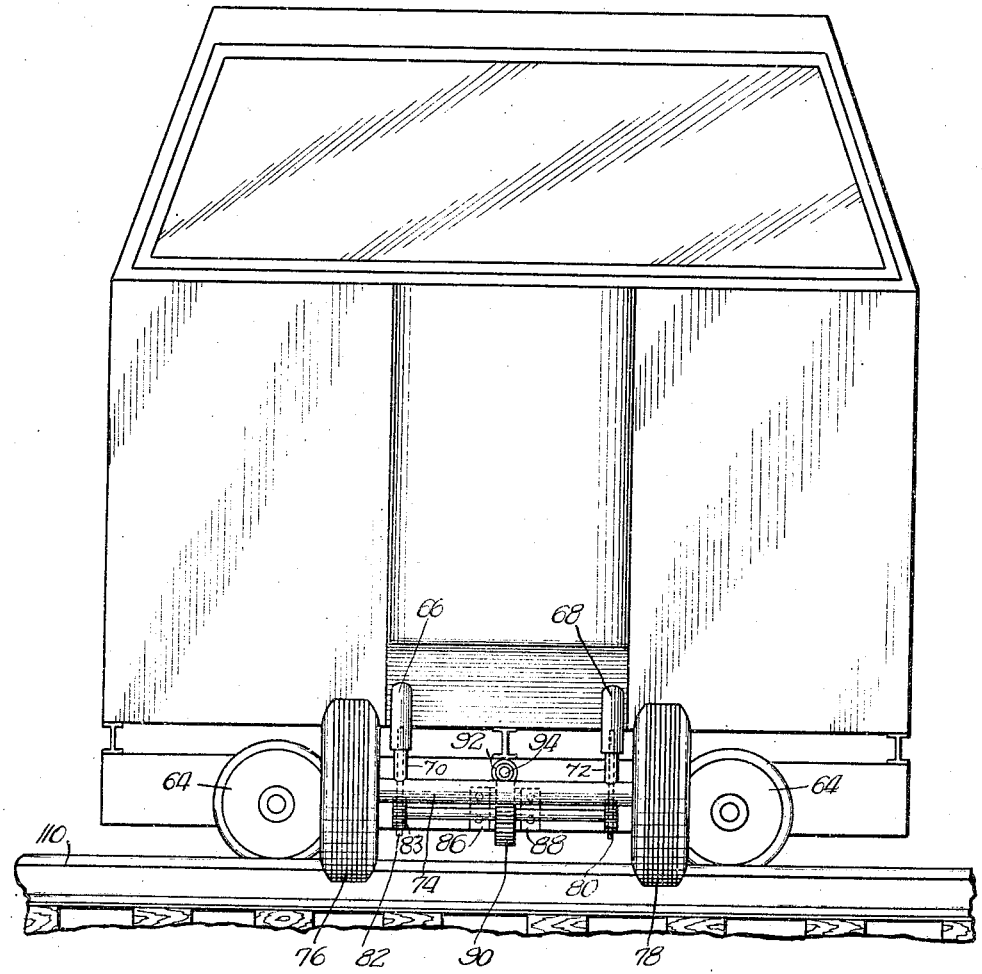
INVENTORS.
Chester W. McKee,
BY Richard W. McKee,
Wilfred S. Stone
ATTY Patented Nov. 8, 1949

2,487,572

UNITED STATES PATENT OFFICE 2,487,572

MANUAL TAKE-OFF FOR PORTABLE FLAW DETECTOR CARS

Chester W. McKee and Richard W. McKee, Chicago, Ill., assignors, by mesne assignments, to Teledetector, Inc., a corporation of Delaware Application April 25, 1947, Serial No. 743,795

6 Claims. (Cl. 105—162)

This invention relates to a manual take-off for a portable flaw detector car and is a continuation in part of applicants' copending application, Serial No. 628,146, filed November 13, 1945.

Applicants' portable detector car is manned by two men and it follows that two men must be able to get it off the track quickly, because a portable flaw detector car does not operate on a right of way as a train. Operators must be on the lookout for trains and they remove the car from the right of way as a train approaches. It is highly desirable that one man be able to get the car off the track quickly, as occasionally his companion may be several hundred feet away when a train is spotted.

The invention here disclosed is illustrated in two embodiments. The first embodiment is the device as disclosed in the copending application where the weight of the car was something under 800 pounds. One feature of the first embodiment is its ability to drop down to roadbed level on the motor side of the car a pair of road wheels by a control on the opposite side of the car whereby an operator can lower the road wheels into a position similar to that of the wheel on a wheelbarrow from the side of the car to be lifted. This saves times, which may be short due to the speed of an oncoming train. A second feature of this first embodiment of the invention is its utilization of the lifting handles to actuate the road wheel lowering apparatus. This again saves time.

In the second embodiment of the invention, the weight of the car has been increased to a thousand pounds and it is difficult for two men to lift the car high enough so that the flanges clear the trailer track wheels. In this second embodiment, applicants have provided gearing which makes it possible for an operator to raise the heavy side of the car vertically above the track by pushing downwardly on a pair of road wheels. This clears the flanges of the wheels on that side of the car and all that an operator need do is lift the light side of the car and push.

In the drawings:

Fig. 5 is a side elevation of the car shown in Fig. 4.

Figure 1:
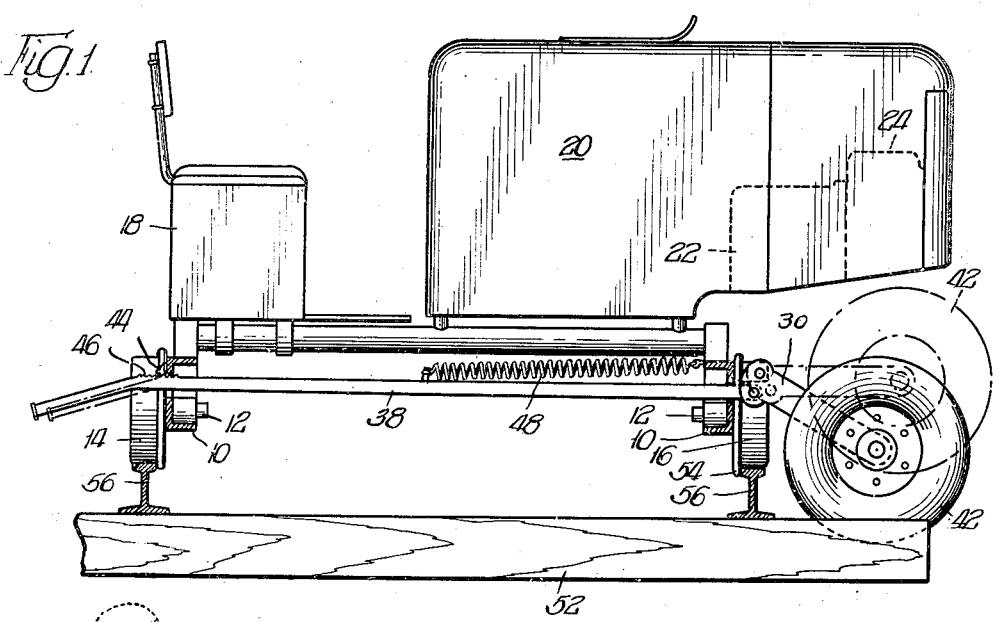
Fig. 1 is a modification of Fig. 11 of the copending application taken transversely through the middle, lower section of the car; and shows the first embodiment of the invention.

Continuing to refer to the drawings, in Fig. 1, 10 identifies the underframe of a four-wheel car shown in transverse section with shafts 12 upon which are mounted flanged, rail wheels 14 and 16. The numerals 18 and 20 identify the seat and equipment casing of applicants' earlier type car. The heavier equipment including a gas engine 22 and generator 24 are mounted above or outside of the wheel 16 so that the center of the load is just a little to the left of the wheel 16.

Figure 3:
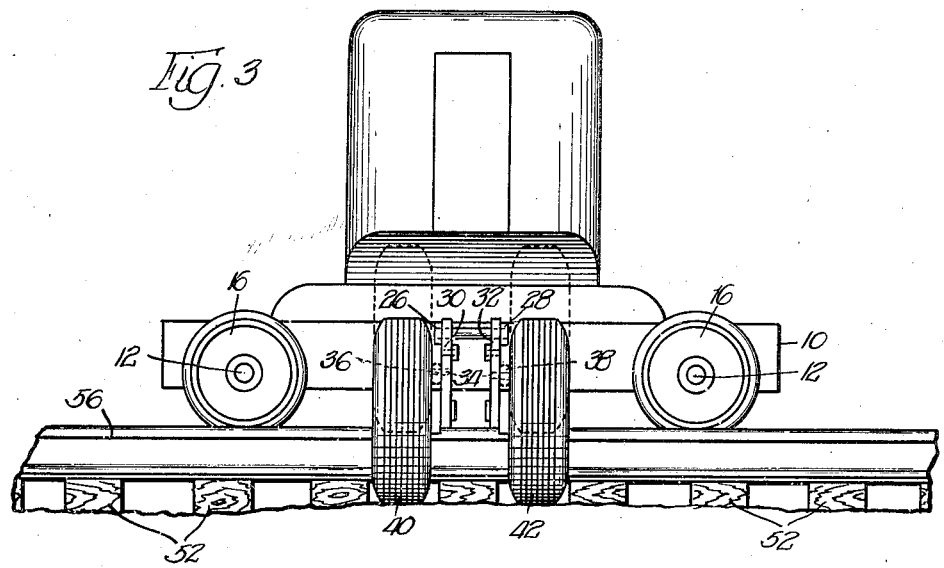
Fig. 3 is a side elevation of the car shown in Fig. 1.

Mounted on the outside of the frame 10 are a pair of brackets 26 and 28 upon which are pivoted a pair of legs 30 and 32—see Fig. 3. Pivotally connected to the legs at 34 are a pair of handle bars 36 and 38 which are guided for horizontal reciprocation in slots in the side members of the frame 10. Fastened to the far outside wall of frame 10 is a tooth or pawl 44 engageable with a ratchet 46 on the top of each of the handle bars. A spring 48 urges the legs upwardly.

Figure 2:
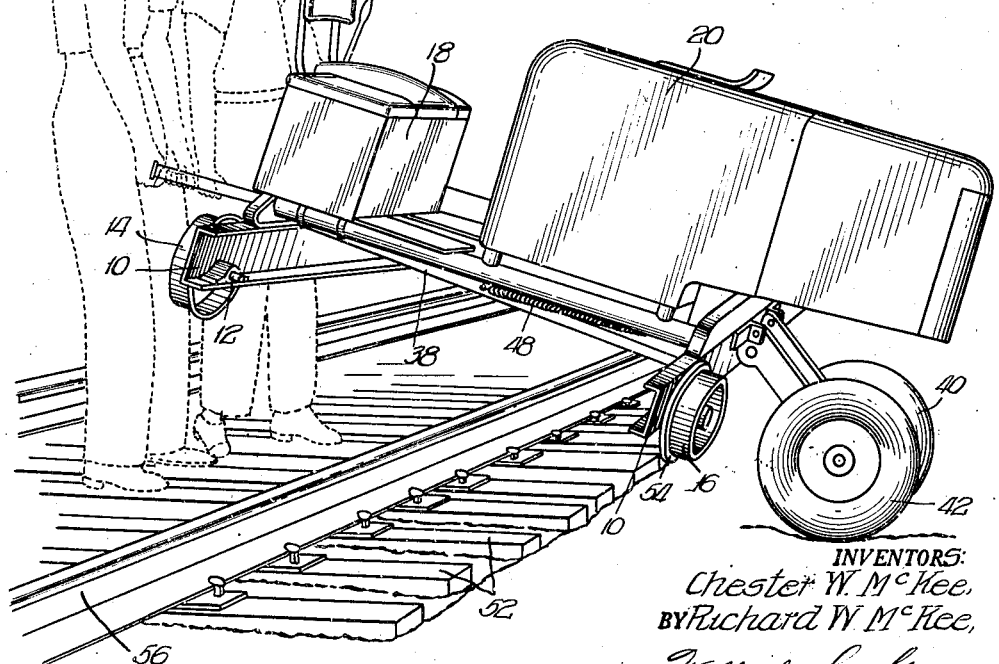
Fig. 2 is Fig. 7 of said copending application.

In order to use, an operator presses down the handles 36 and 38 so as to disengage the ratchet 46 from the pawl 44. Thereupon he pulls the wheels down to the grade, which may be the top of a tie 52. The operator then lifts the handles and in so doing locks the ratchet in the pawl. It is now necessary to raise the control side of the car, that is the side upon which the operator sits, sufficiently high so that the flange 54 on the motor side of the car will clear the rail 56. Assuming that the wheel 42 came to rest on top of a tie, an operator need only move the control side of the car to a point where the bottom of the wheels on the control side of the car are above the knees as illustrated in Fig. 2. If, however, the wheels 40 and 42 dropped into a space between the ties as illustrated in Fig. 1, because the ballast has washed away, it may be quite difficult to clear the flange 54 over the rail 56.

Figure 4:
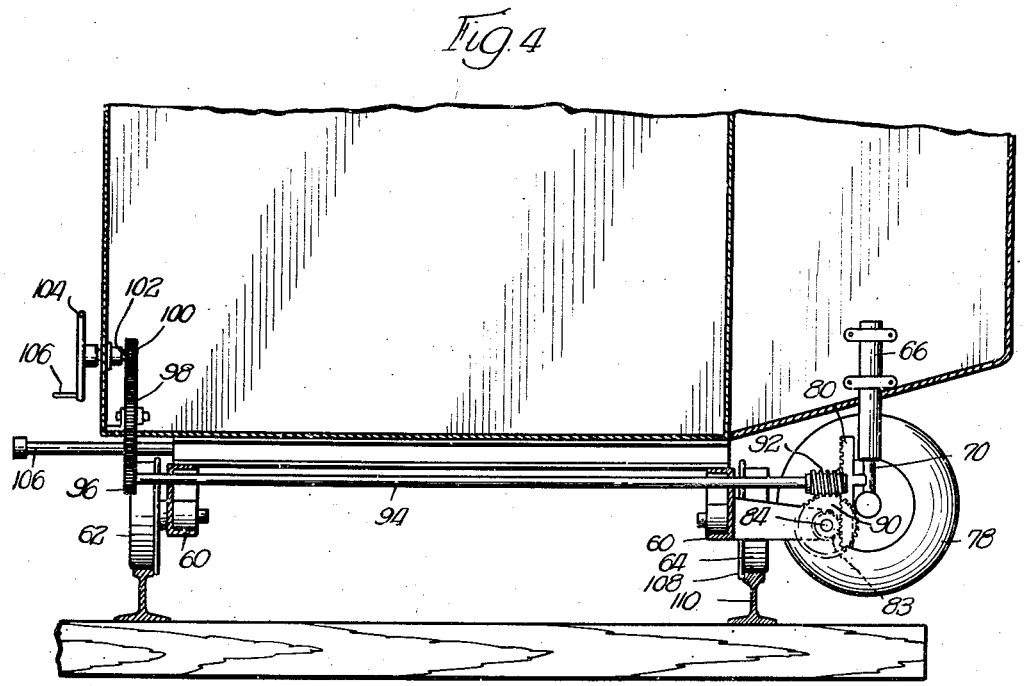
Fig. 4 is a view partly in section of the second embodiment of the invention.

The second embodiment of the invention illustrated in Figs. 4 and 5, and comprising a frame 60 carries wheels such as 62 and 64. Depending from that portion of the framework which supports the motor and generator are a pair of tubes or sleeves 66 and 68 in which are mounted shafts 70 and 72 joined by a cross bar 74 carrying wheels 76 and 78.

Returning to Fig. 4, rigidly fastened to the shafts 70 and 72 at their lower ends are racks 80 and 82 which are in engagement with a pair of pinion gears respectively such as 83, mounted on a shaft 84, supported on brackets 86 and 88 and having centrally of its length a large gear 90. The gear 90 is engaged by a worm 92 on the shaft 94 which is suitably mounted on the frame 60 and which has a pinion gear 96 mounted on its end on the control side of the car. Through idler gear 98 and pinion gear 100 mounted on a shaft 102 carrying actuating wheel 104 and handle 106, the wheel such as 76 can be raised or lowered vertically and the leverage is such that a single man working on the handle 106 can raise the apparatus so that the flange 108 clears the rail 110. The length of the rack such as 80 and the shafts 72 is such that the wheels may engage the ballast several inches below the base of the rail and still raise the flange 108 above the rail.

In considering the two embodiments, the first embodiment will get a car clear of the tracks much more rapidly than the second embodiment. A strong man, referring to Fig. 1, can pull the handle bars back sufficiently hard to at least get the pneumatic tires 40 and 42 under compression even though he does not actually raise the wheels such as 16 off the rail, and then can lift the control side of the car sufficiently to get the flanges 54 clear and push the car off the track. The second embodiment, however, is much more suitable for a heavy car because it always makes it possible to clear the flanges of the wheels beneath the power side of the car. Once this has been done, a single man can get the car off the track for the control side of the car is not heavy. If an operator cannot clear the flanges of the wheels beneath the power side of the car, there is no chance of getting the car off the track.

Having thus described our invention, what we claim is:

1. A portable rail car comprising a frame, flanged wheels for supporting said frame on a pair or rails, a road wheel mounted for vertical movement on the frame at one side of and substantially at right angles to said flange wheels, means for lowering said road wheel from a point above to a point below the bottom of the adjacent flange wheels and into engagement with the roadbed, and mechanical means for transferring the car weight from the adjacent flange wheels to the road wheel whereby the flange wheels are raised above the track, said mechanical means having an actuating element mounted on that side of the car opposite to the side carrying the road wheel.

2. A portable rail car comprising a frame, flanged wheels for supporting said frame on a pair of rails, a pair of road wheels mounted astride the transverse center of gravity of the car and at one side of and substantially at right angles to said flange wheels, means on the frame for lowering the road wheels from a point above to a point below the bottom of the adjacent flange wheels, and mechanical means for transferring the car weight from the adjacent flange wheels to the road wheels whereby the flange wheels are raised above the track, said mechanical means having an actuating element mounted on that side of the car opposite to the side carrying the road wheel.

3. A portable rail car comprising a frame, flanged wheels for supporting said frame on a pair of rails, a pair of vertically disposed sleeves aligned parallel to the forward movement of the car and mounted on the frame astride the transverse center of gravity of the car and at one side thereof, a shaft having a road wheel mounted on its lower end disposed in each sleeve, said shafts being rigidly joined together, a vertically disposed rack fastened to one of said shafts, a pinion gear in engagement with said rack, and crank means for rotating said pinion gear.

4. A portable rail car comprising a frame, flanged wheels for supporting said frame on a pair of rails, a pair of vertically disposed sleeves aligned parallel to the forward movement of the car and mounted on the frame astride the transverse center of gravity of the car and at one side thereof, a shaft having a road wheel mounted on its lower end disposed in each sleeve, a vertically disposed rack fastened to each of said shafts, a pair of pinion gears mounted on a common shaft and respectively in engagement with said racks, and crank means for rotating said common means located on the side of the car opposite to the road wheels.

5. A portable rail car comprising a frame, flanged wheels for supporting said frame on a pair of rails, a road wheel mounted on one side of the frame and substantially at right angles to said flanged wheels, and mechanical means disposed on the opposite side of the frame for lowering said road wheel from a point above to a point below the bottom of the adjacent flanged wheels.

6. A portable rail car comprising a frame, flanged wheels for supporting said frame on a pair of rails, a pair of road wheels mounted astride the transverse center of gravity of the car and at one side of and substantially at right angles to said flanged wheels, and mechanical means mounted on the opposite side of the frame from the road wheels for lowering the road wheels from a point below to a point above the adjacent flanged wheels.

CHESTER W. McKEE.
RICHARD W. McKEE.

REFERENCES CITED

The following references are of record in the file of this patent:

UNITED STATES PATENTS

| Number | Name | Date |
| --- | --- | --- |
| 492,230 | Price | Feb. 21, 1893 |
| 1,604,571 | Hasse | Oct. 26, 1926 |
| 1,827,898 | Moore | Oct. 20, 1931 |

FOREIGN PATENTS

| Number | Country | Date |
| --- | --- | --- |
| 482,444 | Germany | Oct. 28, 1927 |